Figure 1:
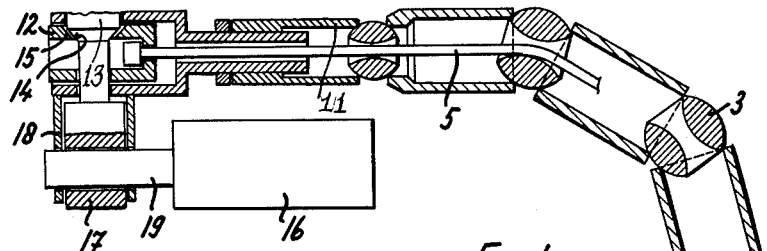

July 9, 1963 P. J. MEIJS 3,096,962
LOCKING DEVICE FOR A MEASURING APPARATUS OR THE LIKE
Filed Jan. 25, 1961

INVENTOR.
PIETER JOHANNES MEIJS
BY
ATTORNEYS

United States Patent Office 3,096,962
Patented July 9, 1963

3,096,962
LOCKING DEVICE FOR A MEASURING
APPARATUS OR THE LIKE
Pieter Johannes Meijs, Hillevliet 43c,
Rotterdam, Netherlands
Filed Jan. 25, 1961, Ser. No. 84,852
Claims priority, application Netherlands Feb. 4, 1960
4 Claims. (Cl. 248—276)

The invention relates to a locking device for a measuring apparatus or the like, comprising a jaw socket and a holder for receiving the shaft of the measuring apparatus.

The known locking devices present the difficulty that they sometimes have to be placed at very inconvenient places on e.g. a lathe or another metal working machine. It is often very hard to adjust the measuring apparatus in the right way.

It is an object of the invention to provide a locking device of the kind described having a more universal character.

According to the invention the holder consists of loose parts being hingeable with respect to one another and being connected with one another by means of a dragband extending through the bore of said parts. In this way, the socket being locked in a suitable way, the holder can be adjusted in every desired position with regard to the piece of work and further it is also possible to place the measuring apparatus itself very accurate with respect to the piece of work to be measured. If the holder, the measuring apparatus respectively, are adjusted in the right way, the position can be fixed by locking the dragband at its free end.

According to an embodiment the dragband is, for this purpose, connected with a gripping apparatus located in the socket, which gripping device can be attended by means of a handle with eccentric.

In order to fix the measuring apparatus in the right position and to render a very easy adjustment possible as well, the dragband at the end remote from the socket, is coupled to a sliding piece which is displaceable in a casing, a bore being applied in the sliding piece, which bore is at right angles to the longitudinal axis of the casing and may have the same size as a bore extending through the walls of the casing, a pin being put into said bores, an inclined surface of said pin being able to co-operate with an inclined surface in the bore of the sliding piece, which pin is provided with a support for the pin of the measuring apparatus.

The pin is preferably provided with a widened part having a bore applied in it at right angles to the longitudinal axis, the casing being provided with a hollow cylindrical part projecting transversally, said widened part being slidable in said cylindrical part, the walls of the hollow cylindrical part having a bore of the same size as the bore in the widened part so that a tube is formed in which the pin of the measuring apparatus can be locked.

One thing and another will be more fully explained with reference to the drawing diagrammatically a sectional view of a locking device according to the invention.

Figure 2:
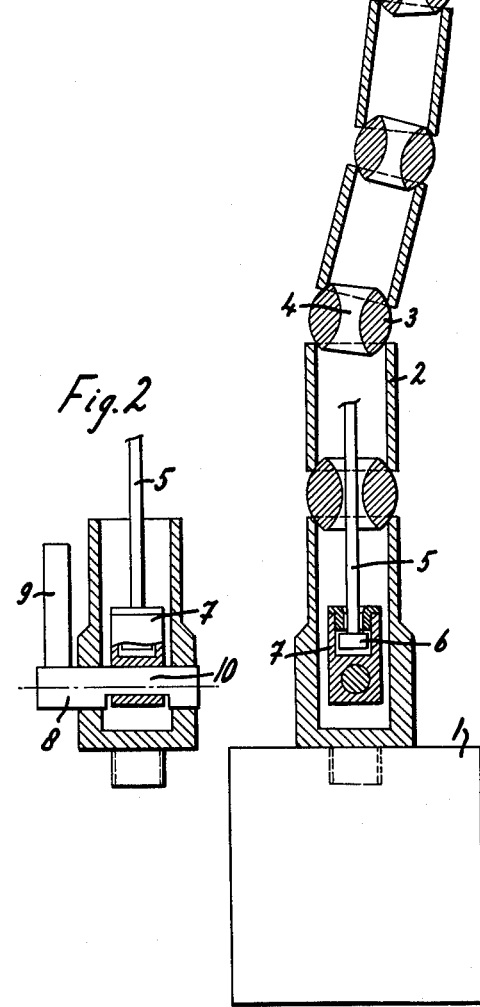

In the drawing:
FIG. 1 shows the device as a whole and
FIG. 2 shows a detail of the drag means.

In the drawn case the socket is referred to by 1 and may be provided with a magnetic system so that said socket can be locked easily and quickly on a metal part of the metal working machine. The holder consists of loose parts being hingeable one with the other. The drawing shows the case in which the holder consists of cylindrical bodies 2 and spherical bodies 3, the last-mentioned being provided with a bore 4. A drag band 5 is led through the cylinders 2 and through the bores 4 too. The drag band 5 is connected at its end located near the socket 1 with a body 7 through which is put a shaft 8 having an eccentric portion 10. Said shaft 8 can be turned by means of a handle 9 or the like due to which the body 7 is pulled downwards which movement is followed by a widened portion 6 of the drag band 5. With its end remote from the socket 1 the drag band 5 is put into a casing-like element 11 in which a slidable piece 12 can move. A bore is made both in the slidable piece 12 and in the wall of the casing 11 so that a continuous tube is formed in which a pin 13 can displace. Said pin 13 has a bevel side 14 which can co-operate with the bevel side 15 of the slidable piece 12. The pin 13 extends to outside the casing 11 and forms there the holder for a measuring apparatus 16. For this purpose the pin 13 and the portion 17 are widened, said portion 17 being surrounded by a hollow cylindrical body 18. Both the widened portion 17 and the walls of the hollow cylindrical member 18 have a bore owing to which a continuous tube is formed in which the pin 19 of the measuring apparatus 16 can be locked.

If the drag band 5 is pulled downwards, the portions 2 and 3 of the holder can move no longer. The slidable piece 12 is then pulled into the casing 11 causing the pin 13 to be pulled along the bevel surface 15 a little bit to the inside. As a consequence of said movement the widened portion 17 too will move with respect to the hollow cylindrical member 18 and the pin 19 of the measuring apparatus is locked. If the device is desired to be released, turning the handle 9 will suffice causing the tension of the drag band to be removed and due to which the holder and the measuring apparatus can be locked again in any other desired position.

I claim:
1. A locking device for a measuring apparatus or the like comprising a socket having means for fixing to a support, a measuring apparatus having a shaft, a holder associated with said socket receiving said shaft, said holder comprising a plurality of loose parts having bores which are hingeable with respect to one another, a dragband extending through said bores of said parts and means for tightening and releasing said dragband to lock and unlock said measuring apparatus from said holder.

2. A device according to claim 1, wherein said means for tightening and releasing comprises a gripping device having an eccentric and a handle attached thereto.

3. A device according to the claim 1 wherein said dragband at its end remote from said socket, is coupled to a sliding piece, a casing for said sliding piece having a bore at right angles to the longitudinal axis of said casing having approximately the same size as said bore in said casing, a pin in said bores, a bevel surface upon said pin and a bevel surface in the bore of said sliding piece cooperating together and a pin in said bores supporting said shaft of the measuring apparatus.

4. A device according to claim 3 wherein said pin is provided with a widened part having a bore applied in it at right angles to its longitudinal axis and said casing is provided with a hollow cylindrical part projecting transversally, said widened part being slidable in said cylindrical part, the walls of the hollow cylindrical part having a bore of the same size as the bore in the widened part so that a tube is formed in which the shaft of the measuring apparatus can be locked.

References Cited in the file of this patent
UNITED STATES PATENTS

| | | |
|---|---|---|
| 936,379 | Stevens | Oct. 12, 1909 |
| 981,948 | Rosenthal | Jan. 17, 1911 |
| 2,280,437 | Levesque | Apr. 21, 1942 |
| 2,510,198 | Tesmer | June 6, 1950 |
| 2,620,708 | Anderson | Dec. 9, 1952 |
| 2,896,472 | Starbird | July 28, 1959 |

FOREIGN PATENTS

| | | |
|---|---|---|
| 965,792 | France | Feb. 22, 1950 |